Patented Jan. 9, 1923.

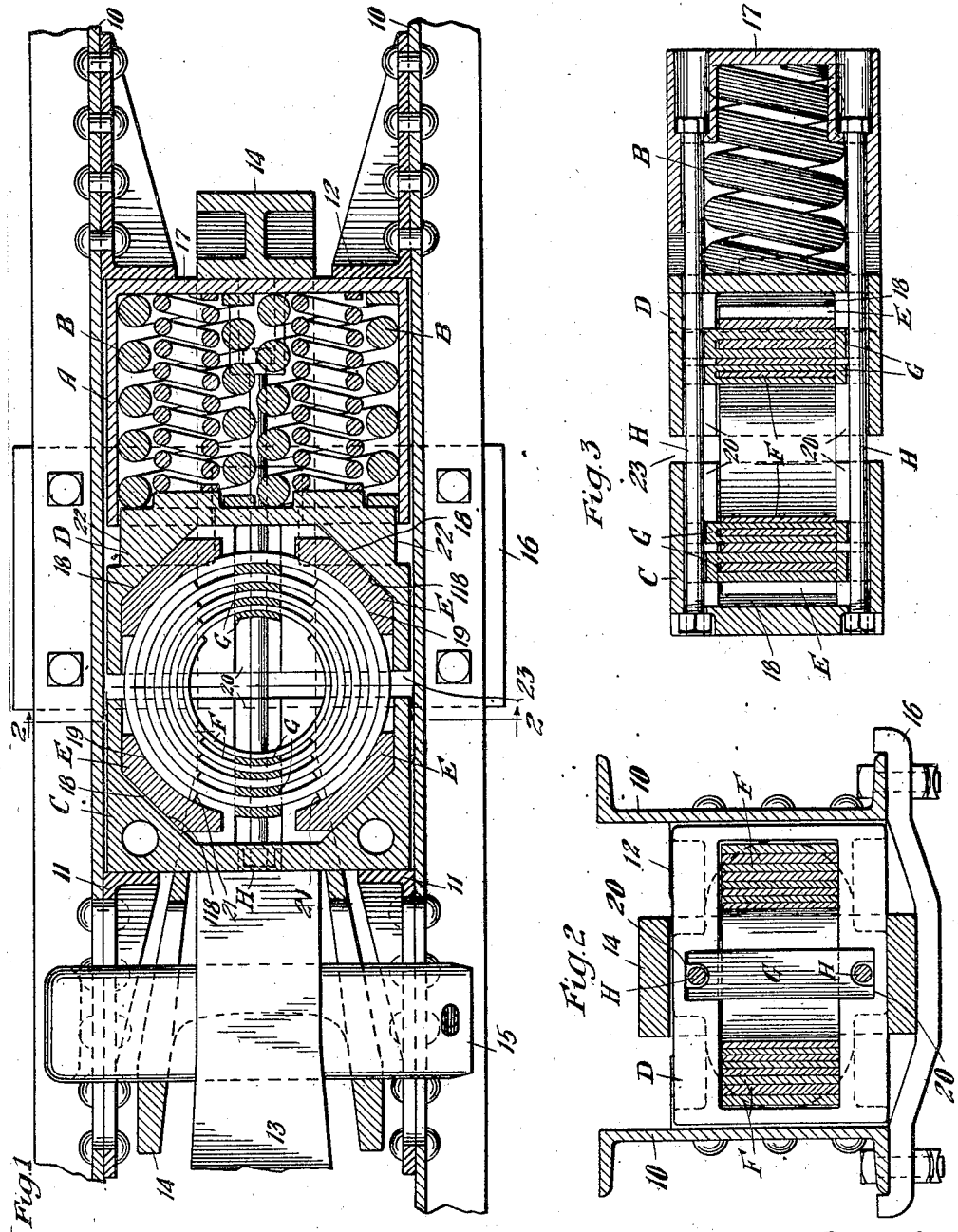

1,441,294

UNITED STATES PATENT OFFICE.

JOHN F. O'CONNOR, OF CHICAGO, ILLINOIS, ASSIGNOR TO WILLIAM H. MINER, OF CHAZY, NEW YORK.

FRICTION SHOCK-ABSORBING MECHANISM.

Application filed January 14, 1921. Serial No. 437,258.

*To all whom it may concern:*

Be it known that I, JOHN F. O'CONNOR, a citizen of the United States, residing at Chicago, in the county of Cook and State of Illinois, have invented a certain new and useful Improvement in Friction Shock-Absorbing Mechanisms, of which the following is a full, clear, concise, and exact description, reference being had to the accompanying drawings, forming a part of this specification.

This invention relates to improvements in friction shock absorbing mechanisms.

One object of the invention is to provide a friction shock absorbing mechanism especially adapted for railway draft riggings wherein is provided a smooth easy action, the mechanism including a friction spring unit and a simple spring unit in tandem formation so cooperating that a gradual change from the simple spring unit resistance to a combined resistance of both units and finally to the resistance of the friction spring unit, is obtained.

A specific object of the invention is to provide a friction spring unit employing a plurality of intercalated spring steel circular plates in combination with novel guiding and spacing means therefor.

In the drawing forming a part of this specification, Figure 1 is a horizontal, longitudinal, sectional view of a portion of a railway draft rigging showing my improvements in connection therewith. Figure 2 is a vertical, transverse, sectional view corresponding substantially to the line 2—2 of Figure 1. And Figure 3 is a longitudinal, vertical, central section of the shock absorbing mechanism proper.

In said drawing, 10—10 denote channel center or draft sills of a railway car to the inner faces of which are secured front stop lugs 11 and rear stop lugs 12. A portion of a drawbar is indicated at 13, the drawbar being operatively associated with the shock absorbing mechanism proper by a hooded cast yoke 14 and coupler key 15. The shock absorbing mechanism is disposed within the yoke 14 and the latter is adapted to be supported in operative position by a detachable saddle plate 16.

The improved shock absorbing mechanism proper, as shown, comprises broadly, a front friction spring unit and a rear simple spring unit. In the rear spring unit I employ a substantially rectangular casing or cage A and twin springs B—B. In the front friction spring unit I employ a front follower C; a rear follower D; four friction shoes E—E; a series of circular or ring-like friction spring plates F; and a plurality of guides G—G. All of the parts are held in assembled relation by suitable retaining bolts H—H, which extend from the casting A to the follower C and have their heads and nuts seated in suitable recesses in said parts.

The spring cage A has an integral rear wall 17, which acts as a rear follower for the mechanism in cooperation with the stops 12. The follower C cooperates with the front stops 11. Each of the followers C and D is formed on its inner side with oppositely arranged inclined faces 18—18 each of which preferably extends at an angle of approximately 45° with respect to the axis of the mechanism. Each of the shoes E has an outer friction face 118 cooperable with a corresponding face 18 and in this connection it will be noted that the length of the faces 118 is less than the length of the faces 18 so as to permit the shoes E sliding angularly with respect to the followers C and D. On their inner faces, the followers E are curved as indicated at 19 to conform to the curvature of the outermost one of the spring plates F.

As clearly shown in Figure 1, it will be seen that the friction plates F, in normal release position, have a gap or opening therein whereby the circumference of each plate may be reduced during the actuation of the mechanism. Alternate ones of said friction plates F have their openings disposed toward the left as viewed in Figure 1 and the remainder have their openings or gaps disposed toward the right as viewed in said figure. Preferably, the thickness of the spring plates F is gradually increased from the innermost one to the outermost one so as to thereby obtain the most effective action from each plate without danger of rupturing any of them during the compression stroke. As shown in Figures 2 and 3, the followers C and D are provided with centrally disposed upper and lower longitudinally extending grooves 20—20 within which are guided the upper and lower ends of the spacer guides G. Each of the latter is in the form of a closed rectangular loop with the central opening thereof of sufficient area to easily accommodate the respective spring plate which is passed therethrough. In the drawing I have shown eight friction plates F so that only four of the spacer guides G are necessary, arranged in groups of two each. By employing the spacer guides G, it will be seen that the edges of the spring plates, as for instance those references 21—21 of the outermost plate F, will be limited in their circumferential approach. This prevents the friction plates from becoming angularly shifted which might otherwise be possible and which would permit all of the openings of the springs to come into alinement and thereby interfere with the successful contraction of the spring plates. Said spacer guides also assist in strengthening the spring plates at those points where the plates are not in contact with each other in the center line of compression, thereby avoiding buckling of said plates during compression. In other words, said spacer guides afford an extended backing for the individual spring plates at each side so as to render substantially uniform the resistance of said spring plates to buckling throughout their circumference.

The follower D is cut away on opposite sides as indicated at 22—22 so that it may telescope within the casing A. The amount which said follower D may move relatively to the casing A is made less than the complete stroke of the mechanism and preferably will be made about 1¾" where the total compression stroke is 2¾", the remaining inch of the compression stroke being obtained between the two followers C and D as indicated by the space 23.

The plates F being of spring steel obviously afford both a spring and a frictional resistance when sliding on each other and simultaneously contracting. Also friction is generated between the outermost spring plate and each of the shoes E and between the shoes E and the followers C and D, since the shoes E will laterally approach each other as the followers C and D are moved into contact, the inner surfaces 19 of the shoes E always tending to conform to the circumference of the outermost spring plate F. The ultimate capacity of the friction spring unit is made appreciably greater than the ultimate capacity of the simple spring resistance B—B but at the same time the initial combined spring and frictional resistance of the spring friction unit is made intermediate the initial and ultimate capacity of the simple spring unit B—B. In operation, assuming an inward or buffing movement of the drawbar, the resistance during the first part of the compression stroke will be afforded by the simple spring unit B—B until the friction spring unit as an entirety has moved rearwardly a part of the 1¾" relatively to the rear spring unit. After the friction spring unit has moved a part of its distance as an entirety relatively to the rear spring unit, the friction spring unit begins to contract, thus gradually increasing the total resistance of the mechanism until the follower D is finally limited in its rearward movement relatively to the casing A. The last portion of the compression stroke is taken up in the remainder of the movement permitted between the two followers C and D at which time the high combined spring and friction resistance is obtained within the friction spring unit. In this manner I obtain a graduated and smooth increase in the capacity, as will be obvious to those skilled in the art.

I have herein shown and described what I now consider the preferred manner of carrying out the invention but the same is merely illustrative and I contemplate all changes and modifications that come within the scope of the claims appended hereto.

I claim:

1. In a friction shock absorbing mechanism, the combination with a pair of followers relatively movable in the line of compression, said followers having longitudinally alined guiding grooves; of a series of intercalated spring friction circular plates disposed within said followers, each of said spring plates having a gap therein between its free edges, the gaps of alternate plates being disposed at one side and those of the other plates opposite thereto; and a plurality of guides longitudinally slidable in said grooves, said guides being interposed between alternate plates at points corresponding to the gaps in the remaining alternate plates.

2. In a friction shock absorbing mechanism, the combination with a pair of followers relatively movable in the line of compression, said followers having interior friction faces inclined relatively to the line of compression; of a plurality of friction shoes slidably mounted on said friction faces, each of said shoes having a curved inner face; a series of intercalated spring friction circular plates confined within the curved faces of said shoes, said plates being circumferentially contractible and expansible; and a plurality of spacer guides cooperable with said plates, said guides being slidably mounted with respect to the followers in a direction parallel to the line of compression.

3. In a friction shock absorbing mechanism, the combination with a pair of followers relatively movable in the line of compression, said followers having longitudinally alined guiding grooves; of a series of intercalated spring friction circular plates disposed within said followers, each of said spring plates having a gap therein between its free edges, the gaps of alternate plates being disposed at one side and those of the other plates opposite thereto; a plurality of guides longitudinally slidable in said grooves, said guides being interposed between alternate plates at points corresponding to the gaps in the remaining alternate plates; and a simple spring unit arranged in tandem with said followers and plates, one of said followers bearing directly on one end of said simple spring unit.

4. In a shock absorbing mechanism of the character described, the combination with a spring casing having a wall adapted to act as a follower; of a simple spring resistance disposed within said casing; a follower telescoped with respect to said casing and bearing directly on one end of said spring unit, said follower being movable relatively to the casing for a limited distance less than the complete stroke of the mechanism; another follower movable relatively to the last named follower for a limited distance also less than the complete stroke of the mechanism; a plurality of intercalated spring friction circular plates disposed within said second and third named followers, said plates being circumferentially contractible and expansible; a plurality of friction shoes interposed between the outermost one of said plates and said second and third named followers and movable relatively to the latter; and spacer guides cooperable with said plates and longitudinally movable with respect to said followers.

In witness that I claim the foregoing I have hereunto subscribed my name this 30th day of Dec. 1920.

JOHN F. O'CONNOR.

Witnesses:
CARRIE GAILING,
UNA C. PERIN.